United States Patent [19]
Wolff

[11] Patent Number: 5,489,104
[45] Date of Patent: Feb. 6, 1996

[54] SEALING ARRANGEMENT HAVING INFLATION AND SUCTION CHAMBERS

[75] Inventor: Helmut Wolff, Hamburg, Germany

[73] Assignee: Draftex Industries Limited, Edinburgh, Scotland

[21] Appl. No.: 170,515

[22] Filed: Dec. 20, 1993

[30] Foreign Application Priority Data

Dec. 22, 1992 [GB]  United Kingdom ............. 9226743

[51] Int. Cl.$^6$ ................ F16J 15/46; E06B 7/16
[52] U.S. Cl. .............. 277/34; 277/184; 49/477.1; 49/498.1
[58] Field of Search ................... 277/3, 28, 29, 277/34, 183, 184, 201, 226; 49/477.1, 480.1, 490.1, 498.1

[56] References Cited

U.S. PATENT DOCUMENTS

| | | | |
|---|---|---|---|
| 2,910,209 | 10/1959 | Nelson | 277/226 X |
| 3,831,950 | 8/1974 | Bentley et al. | 49/477.1 X |
| 4,469,355 | 9/1984 | Moore | 49/477.1 X |
| 4,761,917 | 8/1988 | Knecht et al. | 49/477.1 |
| 4,870,783 | 10/1989 | Hermann et al. | |
| 4,976,067 | 12/1990 | Maass | 49/477.1 X |
| 5,046,285 | 9/1991 | Fratini, Jr. et al. | 49/477.1 X |
| 5,072,545 | 12/1991 | Nozoki | 49/498.1 X |
| 5,253,453 | 10/1993 | Maass et al. | 49/477.1 X |
| 5,339,488 | 8/1994 | Maass | 49/477.1 X |

FOREIGN PATENT DOCUMENTS

| | | |
|---|---|---|
| 0330771 | 9/1991 | European Pat. Off. . |
| 0486163 | 5/1992 | European Pat. Off. . |
| 2211896 | 9/1973 | Germany .............. 49/477.1 |
| 4112294 | 11/1991 | Germany . |
| 950062 | 2/1964 | United Kingdom ........ 49/477.1 |
| 1550300 | 8/1979 | United Kingdom . |
| 2067637 | 7/1981 | United Kingdom . |
| 2221487 | 2/1990 | United Kingdom . |
| 2244078 | 11/1991 | United Kingdom . |

Primary Examiner—Scott W. Cummings
Attorney, Agent, or Firm—Leydig, Voit & Mayer, Ltd.

[57] ABSTRACT

A sealing arrangement is shown for providing enhanced sealing for the edge of a window pane for the window opening in the upper part of the door of a vehicle body. In the case where the door carries no frame for the window, the sealing arrangement is carried by the frame of the door opening. The sealing arrangement comprises longitudinally extending lips defining a shallow groove between them, and in the base of which groove are formed apertures. When the window pane is in the closed position, suction is applied to the groove through holes in its base, and ensures that the lips are in enhanced sealing and supporting contact with the periphery of the window glass. The lips and the groove are formed in an outside wall of a chamber to which pressure can be applied so as to force the lips towards the window pane. The pressure in the chamber and the suction in the chamber can be controlled in synchronism with the raising and lowering of the window pane and with the opening and closing of the door.

16 Claims, 4 Drawing Sheets

SEALING ARRANGEMENT HAVING INFLATION AND SUCTION CHAMBERS

BACKGROUND OF THE INVENTION

The invention relates to sealing arrangements.

In a particular embodiment of the invention to be described in more detail below, by way of example only, a sealing arrangement is provided for sealing the slidable window glass of a window opening in a vehicle body such as, in particular, the window opening in the upper portion of a vehicle door. In such a case, of course, the window glass is slidable in a substantially vertical direction between a closed position in which it is raised vertically to the fullest extent and an open position in which it is located within the hollow interior of the door. When the window glass is fully raised, it is important that the window makes a draught and weather proof seal. This is particularly difficult at high vehicle speeds. Under such circumstances, a substantial pressure difference can arise between the inside and the outside of the vehicle, the pressure on the inside becoming significantly greater than that on the outside—partly because of aerodynamic effects and partly because of the increase of pressure within the vehicle resulting from entry of fresh air for the vehicle's heating, ventilating and air-conditioning system. Such pressure difference tends to force the window glass outwardly of the vehicle and considerably reduces the sealing efficiency of the sealing arrangement around the periphery of the window glass. This problem can arise with normal types of sealing arrangement incorporated within the normal window frame mounted on the vehicle door, but is particularly significant where the window is in fact "frameless"—that is, no frame for the window is carried by the door and the window has to seal against a sealing arrangement carried by the vehicle body (around the door opening).

BRIEF SUMMARY OF THE INVENTION

According to the invention, there is provided a sealing arrangement for sealing against a panel slidable in a predetermined path, comprising flexible material defining a sealing area of predetermined shape which is mounted alongside the predetermined path, and pressure control means operative to produce a change in ambient pressure acting on the said area, whereby to provide enhanced sealing contact between the flexible material and the slidable panel.

According to the invention, there is also provided a sealing arrangement for sealing against a slidable window glass pane of a vehicle window, comprising flexible material defining a sealing area of predetermined shape and mounted to be adjacent at least part of the peripheral edge of the window opening, and pressure means for applying pressure to the flexible material to force it into enhanced sealing contact with part of the peripheral edge of the window glass pane when the window is closed.

DESCRIPTION OF THE DRAWINGS

Sealing arrangements embodying the invention, for sealing around the slidable glass panes of windows in vehicle bodies, will now be described, by way of example only, with reference to the accompanying diagrammatic drawings in which.

DESCRIPTION OF PREFERRED EMBODIMENTS

In all Figures, corresponding items are similarly referenced.

Figure 1:
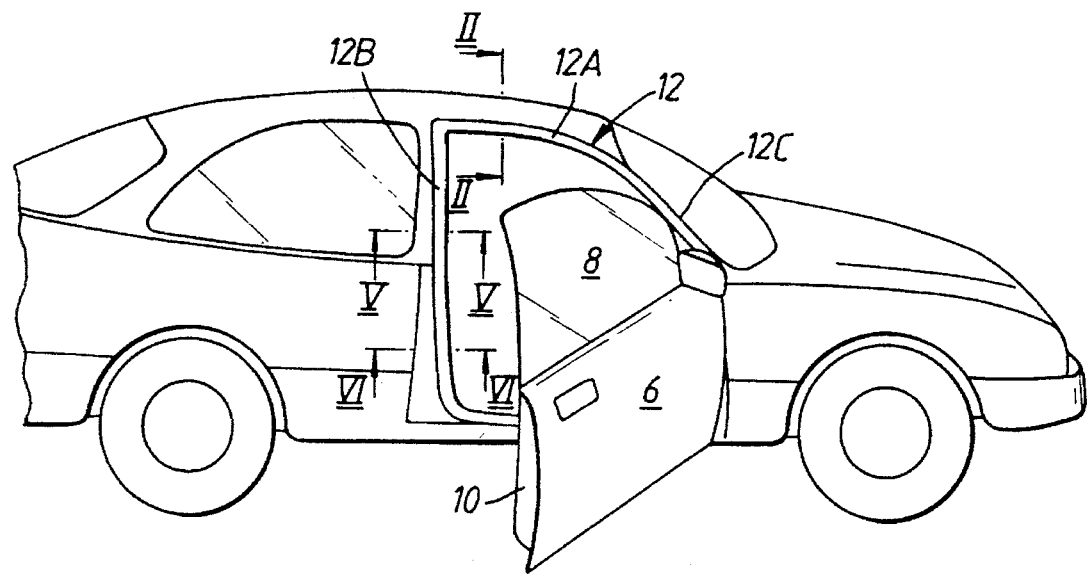
FIG. 1 is a diagrammatic perspective side view of part of a vehicle body showing a door and window opening.

As shown in FIG. 1, a vehicle body has a door 6 carrying a window glass 8. The window glass can be raised and lowered in the conventional manner by means of a window mechanism disposed in the lower part 10 of the door. In the particular example being described, the window opening is frameless. In other words, the door 6 consists only of the lower portion 10 together with the window glass 8; the lower portion 10 carries no frame surrounding the window opening. Such a door construction is used in certain types of vehicles such as coupes and vehicles with removable tops.

When the window glass 8 is in its uppermost or closed position, therefore, it seals (in the manner to be described) against a sealing arrangement carried by the vehicle body and located on the frame 12 of the door opening (but the sealing arrangement is not shown in FIG. 1). It will be apparent that such sealing arrangement can only provide a seal against a peripheral strip of the inside face of the window glass. The sealing arrangement cannot be in the form of a channel, which could also seal against a peripheral strip on the outer face of the window glass 8, because this would mean that the door could not be closed with the window glass in its fully raised position.

The sealing arrangement (FIG. 2) for the top 12A of the door opening is supported on a flange 14 which extends around the door opening and forms the frame of the opening. The flange 14 is produced where the inner and outer body panels 16,18 are welded together at the door opening, and the flange lies substantially in the plane of the door opening.

Figure 2:
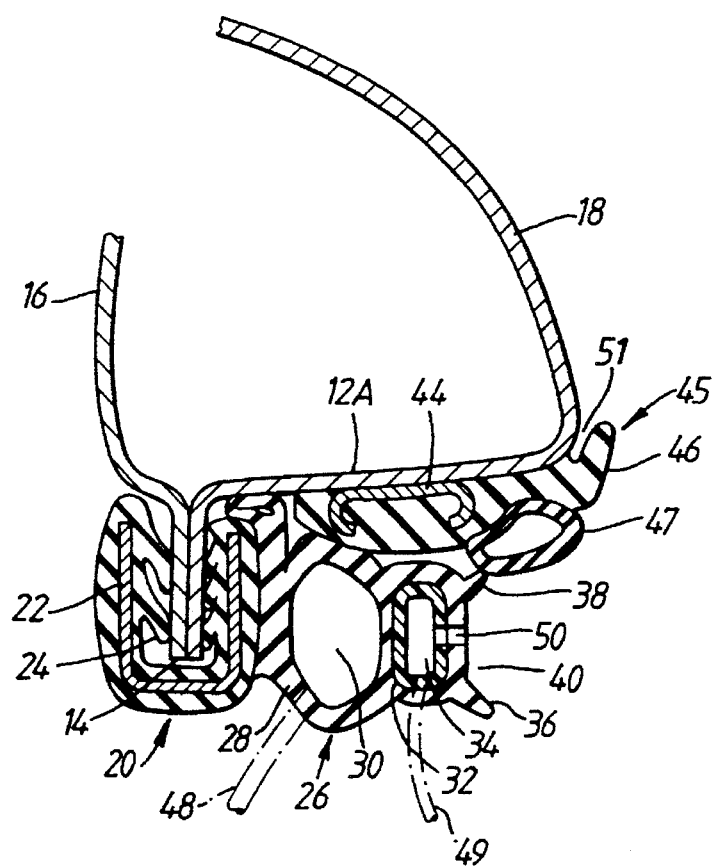
FIG. 2 is a section on the line II—II of FIG. 1 showing the door frame and one of the sealing arrangements fitted to it, the door being open.

As shown in FIG. 2, the sealing arrangement comprises a channel-shaped gripping part 20 which is made of extruded plastics or rubber or similar material in which is embedded a metal reinforcement or carrier 22. The metal carrier may take any suitable form. For example, it may be made of channel-shaped metal which may be formed with apertures to render it flexible. In a more specific example, it can be made of U-shaped elements arranged side-by-side so as together to define a channel and being either entirely disconnected from each other or connected by short integral connecting links. Instead, it could be made of wire looped to and fro so as to define a channel. Other forms of carrier can be used and need not be made of metal.

The metal carrier 22 is advantageously incorporated into the gripping part 20 using a cross-head extrusion process.

The extrusion process for producing the gripping part 14 may be arranged to produce integral flexible gripping lips one of which is referenced 24. As shown in FIG. 2, the gripping part 20 embraces the flange 14 and firmly supports the sealing arrangement in position. The resilience imparted to the gripping part 20 by the carrier 22 helps to secure it in position, as do the gripping lips 24. The latter may advantageously be made of relatively soft material, softer than the rest of the extruded material, to improve the grip.

Attached to the gripping part 20 is a sealing part 26.

This is also made of extruded rubber or plastics or similar material. It may be extruded simultaneously with the material of the gripping part 20 (though can be of a different hardness), or it may be extruded separately and adhesively secured to the gripping part 20. As shown, the sealing part 26 comprises flexible material 28 defining a hollow chamber 30 which carries more rigid material 32 defining a second hollow chamber 34 carrying flexible longitudinally extending lips 36 and 38 on its outwardly facing surface and which have a shallow groove 40 between them.

In addition, the body panel 18 running along the top 12A of the door opening has a metal channel 44 welded to it which carries a secondary seal 45. The latter comprises a base part 46 made of relatively hard rubber or plastics material together with a soft sealing portion 47 comprising a hollow tube. The base part also defines a rain gutter 51.

The sealing arrangement shown in FIG. 2 extends along the top 12A of the door frame and down at least a portion of the side 12B (the so-called "B" pillar of the vehicle) from the corner between the side 12B and the top 12A. The sealing arrangement also has the same form as it extends at least part way down the "A" pillar of the vehicle, that is, the side 12C of the door opening. The shape of the groove 40 and the positioning of the lips 36 and 38 may be altered at the corner between the top 12A and the side 12B of the door opening, the groove 40 opening out into an enlarged generally triangularly-shaped recess, Where the sealing arrangement extends down the "B" pillar, the base part 46 of the secondary seal is modified to eliminate the rain gutter 51.

The chamber 30 of the sealing part 26 is arranged to be air-tight and is connected to a variable air pressure source by means of a pipe indicated diagrammatically at 48. The chamber 34 is connected to a vacuum source by means of a pipe indicated diagrammatically at 49.

The wall of the chamber 34 which forms the base of the groove 40 is formed with holes 50 at intervals and these holes connect with the interior of the chamber 34.

FIG. 2 shows the sealing part 26 in the configuration which it has when the window glass 8 is lowered into the door. This configuration may be the normal or relaxed configuration of the material 28 of the chamber 30, in other words the configuration which the material adopts when the air pressure within the chamber 30 is normal atmospheric pressure. Instead, however, it may be the configuration which the material adopts when a predetermined air pressure (which might be greater or less than ambient pressure) exists within the chamber 30 as produced by the pressure source via the pipe 48. The pressure within the pipe 49, and thus in the chamber 34, is normal atmospheric pressure.

Figure 3:
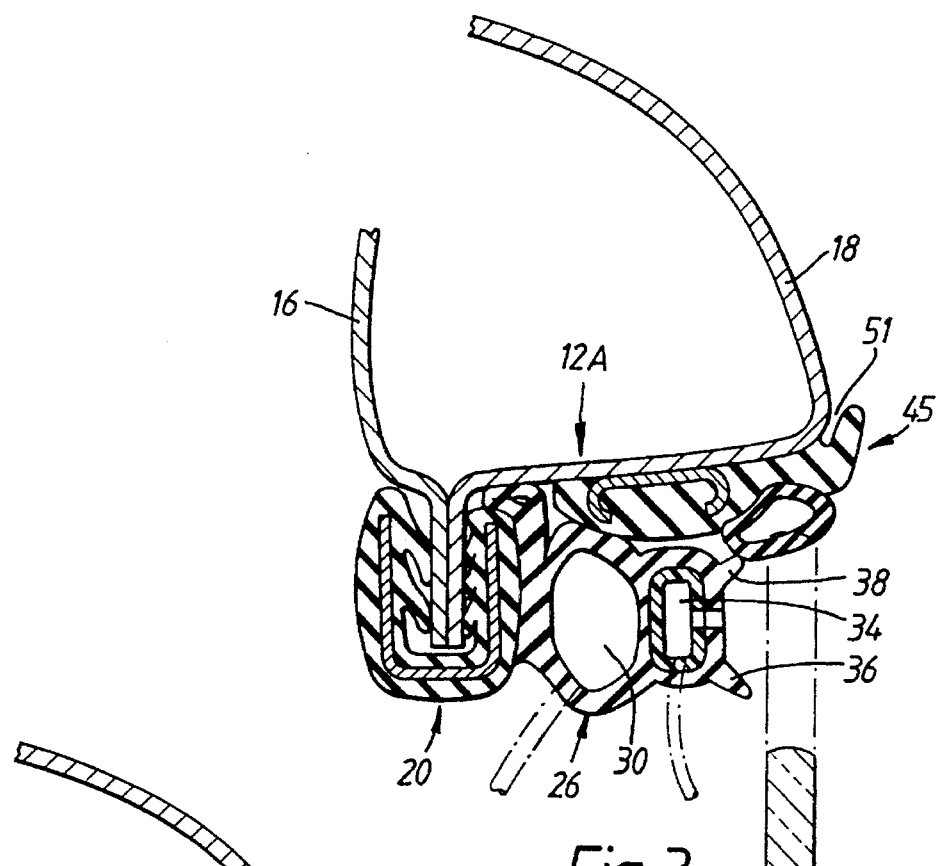
FIG. 3 corresponds to FIG. 2 but shows the sealing arrangement when the window glass is in the process of being raised and the door is closed.

FIG. 3 corresponds to FIG. 2 but shows the window glass 8 being raised and approaching the sealing arrangement.

Figure 4:
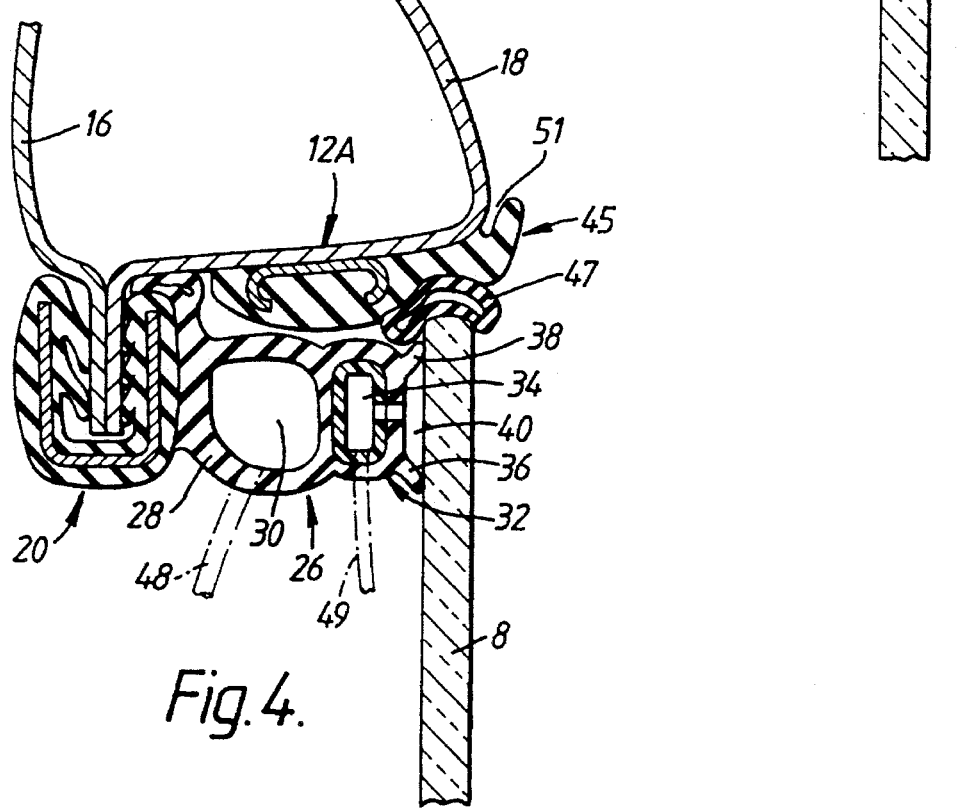
FIG. 4 corresponds to FIG. 3 but shows the window glass fully raised.

FIG. 4 shows the sealing arrangement when the window glass 8 is in its raised position, and the door is closed. This situation may have arisen as a result of raising of the window glass 8 with the door open, followed by closing of the door into its frame, or may have arisen as a result of raising of the window glass 8 in the already-closed door. In either case, however, it will be seen that the window glass 8 engages the lips 36 and 38 which are partially compressed, thus providing a seal around the periphery of the window glass. The situation in FIG. 4 is achieved by two separate steps, now to be described, which take place after the window glass and the door have reached their closed positions so that the glass thus overlies the groove 40.

The first of these steps involves increasing the air pressure within pipe 48 and thus within the chamber 30 so as to expand the material 28. This moves the relatively rigid chamber 32 bodily outwards of the vehicle so that the lips 36 and 38 move into contact with the glass 8. Thereafter, suction is applied via the pipe 49 to the holes 50. This suction pulls the periphery of the window glass and the lips 36 and 38 into tighter sealing engagement. In this way, therefore, a very efficient sealing action is obtained and strong mechanical support is given to the periphery of the window glass. When a vehicle is travelling at speed, a significant pressure differential can exist between the inside and outside of the vehicle, the pressure within the vehicle becoming substantially more than the pressure outside. This is partly due to aerodynamic effects and partly because of the increased air driven into the interior of the vehicle by heating, ventilating and air-conditioning systems. Clearly, such increased air pressure will tend to bend the window glass 8 outwardly thus tending to reduce the sealing contact around the periphery of the window glass. This is resisted by the sealing arrangement shown. The suction applied to the glass maintains effective sealing and helps to prevent undue bending of the glass (because of the above-mentioned air pressure differential) which could in extreme cases cause the glass to break.

The configuration shown in FIG. 2 ensures that a cushioning effect is provided for the glass when the door (with the glass raised) is closed. That is, the projecting lips 36 and 38, even when not moved outwardly by pressure increase in the chamber 30, resiliently contact the glass 8 as it approaches in a sideways direction as the door closes. At the same time, however, such closing is not unduly resisted. Furthermore, because of the relatively flattened configuration of the chamber 30, the lips 36 and 38 will only lightly contact the window glass if it is raised after the door has been closed. This minimises the frictional force acting against the rising window glass. In each case (that is, after the window glass has been fully raised from the closed door or after the door carrying the fully raised glass has been closed), the pressure within the chamber 30 is then increased (as already explained) so as to force the lips 36 and 38 into firm sealing engagement with the window glass periphery, and suction is then applied to the holes 50 so as to provide the final sealing and support action on the window glass.

Advantageously, the window glass 8 is mounted in the door and so configured that when fully raised with the door open, the glass leans inwardly of the vehicle slightly. This reduces the height of the glass slightly and allows its top edge to pass under the secondary sealing portion 47 (see FIG. 2). As the glass contacts the lips 36 and 38 and as pressure and suction are respectively applied to the chambers 30 and 34, the glass tilts so as to become more upright and so that its top edge seals properly in the sealing portion 47.

Once the suction has been applied to the window glass via the holes 50, it would be possible under normal circumstances to reduce the air pressure within the chamber 30 (so long as the pressure were not reduced so significantly that the chamber 30 collapsed and pulled the lips 36 and 38 out of contact with the window glass).

The suction can continue to be maintained when the vehicle is stationary and locked (the suction being maintained by a battery-powered pump for example). This helps to hold the door shut against unauthorised entry.

Figure 6:
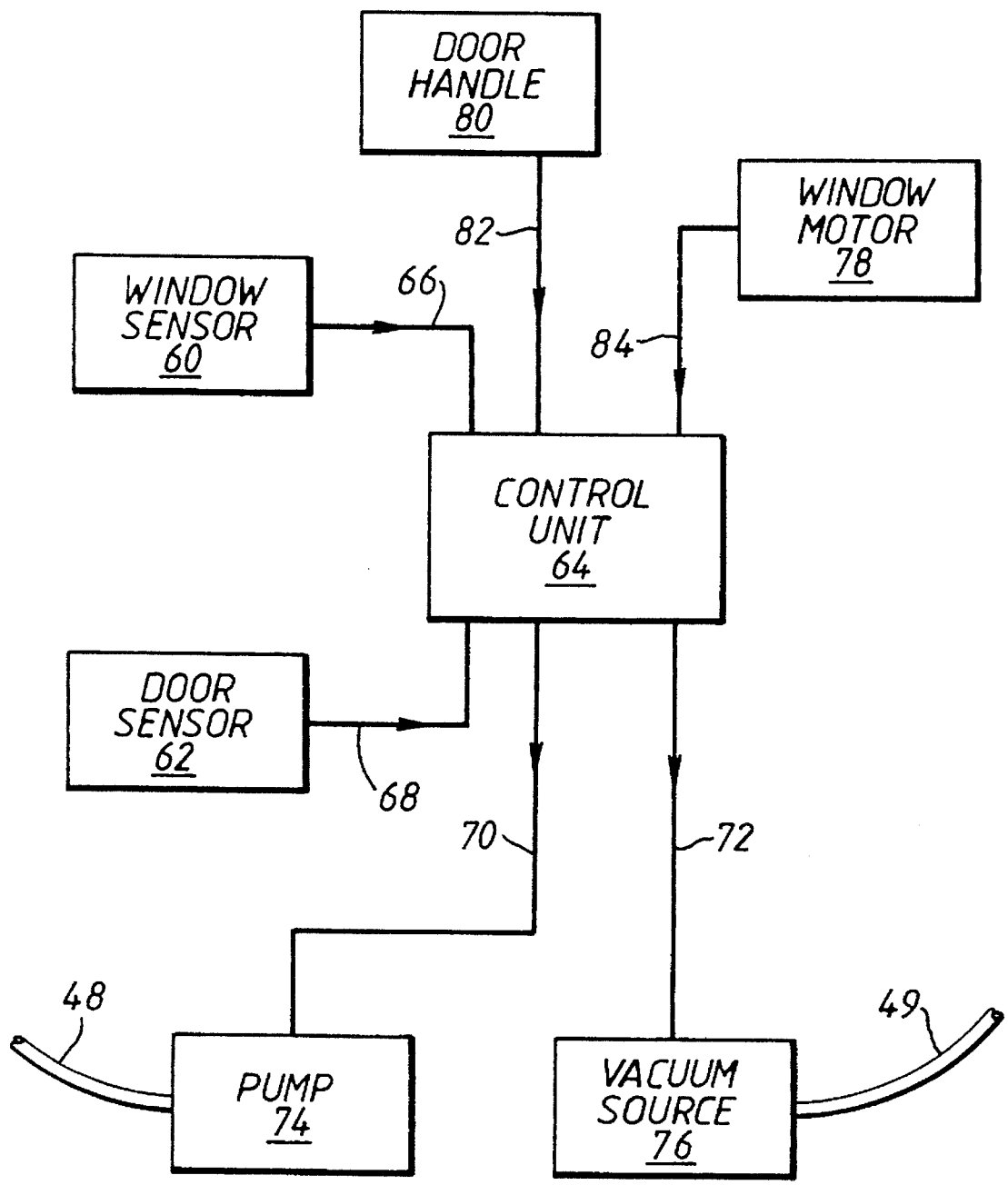
FIG. 6 is a schematic diagram showing a control system which may be used in one of the arrangements.

It is desirable to coordinate the changes in pressure applied to the pipes 48 and 49 with the position of the window glass 8 and with the opening and closing of the door 6. Thus, as shown in FIG. 6, sensors 60 and 62 can be provided to sense the positions of the window glass and the door. Such sensors are connected to a control unit 64 via lines 66 and 68. The control unit 64 is in turn connected via lines 70 and 72 to control a pump 74 and a vacuum source 76 which are respectively connected to the pipes 48 and 49. When sensors 60 and 62 detect that the door is open and/or the window glass 8 is lowered, the control unit 64 activates the pump 74 to reduce the pressure in the chamber 30. When the sensors 60, 52, detect that the window glass is raised and the door is closed, the control unit 64 activates the pump 74 and the vacuum source 76 to raise the pressure in chamber 30 and to apply suction to the holes 50. It is also necessary or advantageous to arrange for the suction applied to the holes 50 and the pressure within the chamber 30 both to be reduced as soon as lowering of the window glass 8 or opening of the door 6 is commenced. For example, in the case where the window raising and lowering mechanism is motorised by a motor 78, such reduction of suction and pressure could be put into action as soon as the motor 78 is energised to lower the window glass. Similarly, such suction and pressure reduction could commence as soon as the door handle 80 is operated to open the door. FIG. 6 shows how signals from the motor 78 and the door handle 80 are fed to the control unit 64 for this purpose on lines 82 and 84.

FIG. 2 also shows how the flexible seal 47 seals against the top edge of the glass 8.

Although the sealing arrangement shown in FIG. 2 has been described as extending along the top 12A and part of the sides 12B and 12C of the door frame, it could extend along greater or lesser lengths of the frame. For example, it might be sufficient for it only to be positioned at the corner between the top 12A and the side 12B of the frame.

It is of course necessary for the ends of the groove 40 to be closed off. This can be done by flexible skirts (not shown) integrally or otherwise sealingly attached to and bridging between the lips 36 and 38 so that the ends of the groove 40 are closed off in ,a suction-tight manner when the glass 8 is raised, these flexible skirts sealingly contacting the glass in tile same way as the lips 36 and 38.

At all other positions around the frame of the opening, that is, positions not occupied by sealing arrangement shown in FIG. 2, a seal of conventional type is advantageously provided, with no inflatable chamber or lips 36,38. FIG. 2 can extend down the "A" and "B" pillars as far as the waistline of the door (that is, the bottom of the window opening 8). Below that point, conventional sealing arrangements can be provided, with a compressible sealing part against which the door closingly seals. However, the dividing line between the sealing arrangement of FIG. 2 and the conventional sealing arrangements may be positioned elsewhere on the "A" and "B" pillars.

The embodiment so far described is for providing a seal for a frameless window opening. In the case where the door carries a frame for the window glass, this frame would (in known arrangements) carry a channel in which the glass slides as it is raised or lowered. Such a channel provides both sealing and support for the glass.

However, in another embodiment of the invention, a sealing arrangement generally similar to that shown in FIG. 2 is used (instead of the known channel-type seal) in the case where the door carries a frame for the window glass. Such an embodiment could be substantially the same as shown in FIG. 2 except that the body panels 16 and 18 would be the inner and outer panels of the window frame carried by the door.

Figure 5:
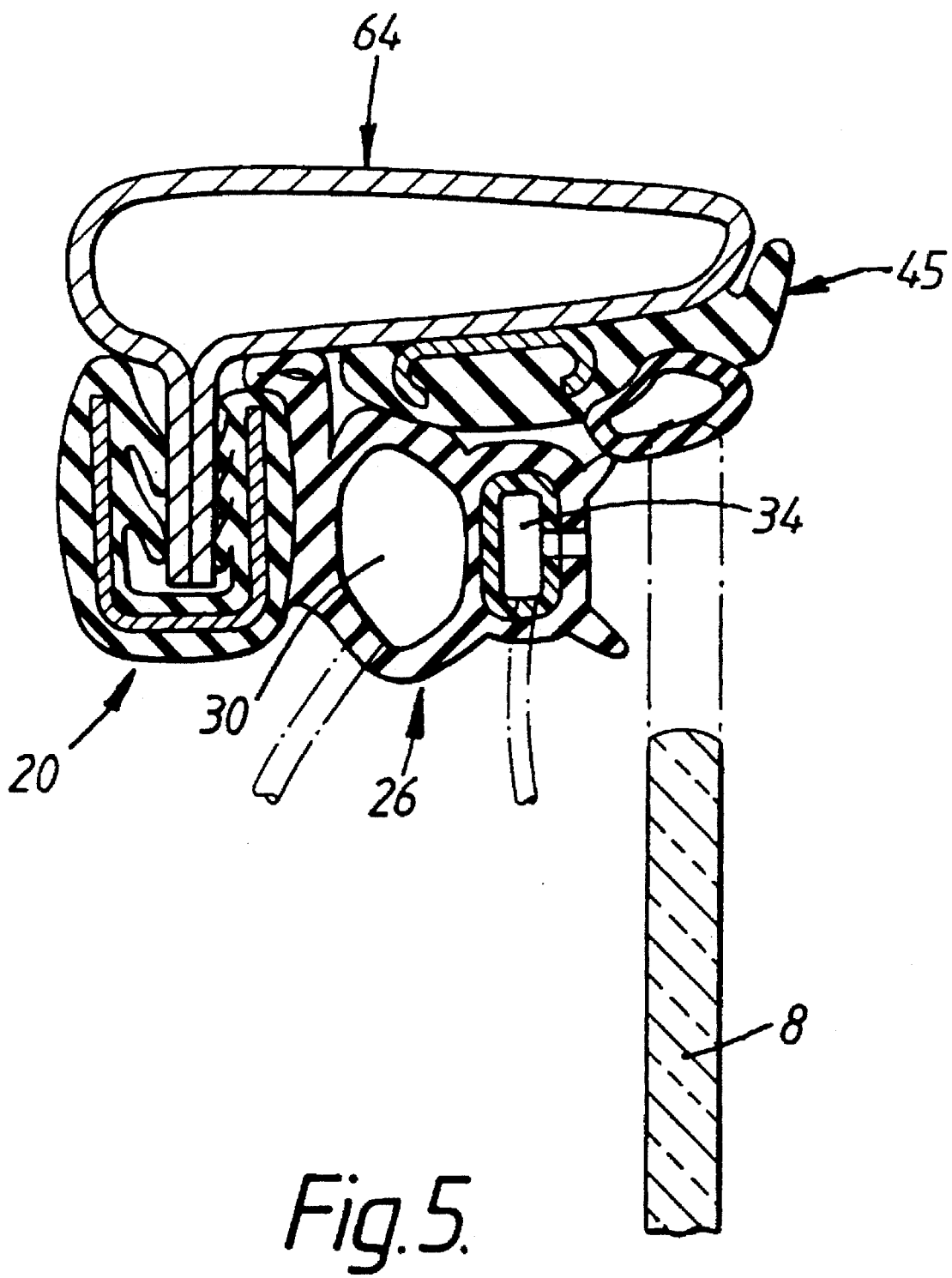
FIG. 5 corresponds to FIG. 2 but shows a sealing arrangement embodying the invention fitted to a window frame rather than to a door frame.

Such an arrangement is shown in FIG. 5, where the the window frame carried by the door is indicated at 64. Other parts are referenced similarly to those of FIG. 2. The construction and operation of the arrangement of FIG. 5 is generally similar to that described above with reference to FIGS. 2 to 4. However, in the case of FIG. 5, the window glass 8 can clearly only approach the sealing arrangement by upward sliding movement (in other words, there can be no bodily sideways movement of the window glass towards the lips 36 and 38 as occurs with the sealing arrangement shown in FIGS. 2 to 4 when the door closes). Therefore, if the pressure within the chamber 30, and the suction applied to the holes 50, are to be controlled automatically (as would normally be the case), sensors do not have to be provided to sense the position of the door, but only the position of the window glass.

The sealing arrangement shown in FIG. 5 is advantageous in that it enables a truly "flush glass effect" to be produced; no part of the sealing arrangement need extend more outwardly of the vehicle to any significant extent than the plane of the outer face of the glass.

In both embodiments described, sealing is effected by applying air pressure to move the sealing lips 36 and 38 into contact with the glass, suction thereafter being applied in order to hold the lips in tight sealing contact with the glass. However, in certain circumstances, it may be possible to effect adequate sealing by applying the pressure only; that is the chamber 34 could be dispensed with. In other cases, it may be possible to effect adequate sealing by applying the suction only; that is, the chamber 30 would not be connected to a pressure source.

The material 32 defining the chamber 34 may be provided with reinforcement to render it relatively rigid. Advantageously, this reinforcement is made of plastics or similar material, rather than metal, to avoid rusting where it is exposed to the air via the through holes 50.

What is claimed is:

1. A sealing arrangement for sealing against a panel slidable in a predetermined path, comprising support means for positioning at a predetermined distance from the predetermined path, flexible material defining a sealing area of predetermined shape, flexible mounting means mounting the flexible material on the support means so that the sealing area is mounted alongside the predetermined path, the flexible mounting means being responsive to a predetermined change in gaseous pressure applied thereto to exert a force on the flexible material which moves the sealing area closer towards the predetermined path, and pressure control means comprising pressure applying means operative to apply said predetermined change in pressure to the flexible mounting means to move the sealing area towards the predetermined path and suction means operative to produce reduced ambient pressure over said area and acting between the flexible material and the slidable panel, whereby to provide enhanced sealing contact between the flexible material and the slidable panel, so as to tend to draw them together.

2. An arrangement according to claim 1, in which the suction means comprises least one aperture in the flexible material, and means for applying suction to said at least one aperture.

3. A sealing arrangement according to claim 1, in which the flexible mounting means includes means defining a hollow chamber having a resilient and flexible wall, the flexible material defining the sealing area being connected to said resilient and flexible wall, and pressure applying means comprises means for applying said predetermined pressure change to the the interior of the chamber.

4. A sealing arrangement according to claim 3, in which the sealing area comprises two flexible lips mounted on the flexible wall of the chamber and running alongside the predetermined path and extending away from the flexible wall towards the predetermined path and defining a groove between them.

5. A sealing arrangement according to claim 3, in which an initial pressure exists within the hollow chamber when the sealing arrangement is in a non-sealing condition, wherein said initial pressure is selected from the group consisting of ambient pressure, a pressure greater than ambient pressure, and a pressure less than ambient pressure, and wherein the predetermined pressure change is an increase in said initial pressure.

6. A sealing arrangement according to claim 1, in which the sealing area comprises two flexible lips which run alongside the predetermined path and both extend towards the predetermined path so as to define a groove between them.

7. A sealing arrangement according to claim 6, in which the suction means comprises at least one aperture in the flexible material and opening into said groove, and means for applying suction to said at least one apertures.

8. A sealing arrangement according to claim 1, in which the slidable panel is a slidable pane of glass for a window opening.

9. A sealing arrangement for sealing against a slidable window glass pane of a vehicle window, comprising support means for positioning at a predetermined distance from and alongside the window.

flexible material defining a sealing area of predetermined shape, flexible mounting means mounting the flexible material on the support means so that the sealing area is mounted to be adjacent at least part of the peripheral edge of the window opening, the flexible mounting means comprising a resilient and flexible wall defining a hollow chamber, the flexible material defining the sealing area being supported on the outside of the resilient and flexible wall, pressure applying means for applying a change in gaseous pressure to the interior of the hollow chamber to cause it to expand and move the sealing area towards part of the peripheral edge of the window glass pane when the window is closed, and suction means connected to reduce the atmospheric pressure between the sealing area and the said part of the periphery of the closed window pane whereby to bring the flexible material and the periphery of the window pane into enhanced sealing contact.

10. A sealing arrangement according to claim 9, in which the sealing area comprises two lips of flexible material mounted on the outside of the resilient and flexible wall of said hollow chamber to run alongside the window and extending towards the window with a groove between them.

11. A sealing arrangement according to claim 10, in which the suction means comprises a plurality of apertures opening into the groove and means for applying suction to the apertures from outside the groove.

12. A sealing arrangement according to claim 9, in which the window pane is carried by a door of the vehicle and is slidable into and out of the lower part of the door for opening and closing the window opening formed above the lower part of the door, and in which the door carries no frame for the window opening, the sealing arrangement being attached to part of the frame on the vehicle body for the door opening.

13. A sealing arrangement according to claim 12, including control means for controlling the operation of the pressure applying means and the suction means in dependence on the position of the door in relation to the door opening and on the position of the window pane in relation to the window opening.

14. A sealing arrangement according to claim 9, in which the window pane is carried by a door of the vehicle and is slidable into and out of the lower part of the door for opening and closing the window opening formed above the lower part of the door, and in which the door carries a frame for the window opening, the sealing arrangement being attached to the latter frame.

15. A sealing arrangement according to claim 14, including control means for controlling the operation of the pressure applying means and the suction means in dependence on the position of the window pane in relation to the window opening.

16. A sealing arrangement according to claim 9, in which an initial pressure exists within the hollow chamber when the sealing arrangement is in a non-sealing condition, wherein said initial pressure is selected from the group consisting of ambient pressure, a pressure greater than ambient pressure, and a pressure less than ambient pressure, and wherein the predetermined pressure change is an increase in said initial pressure.

* * * * *